April 17, 1962

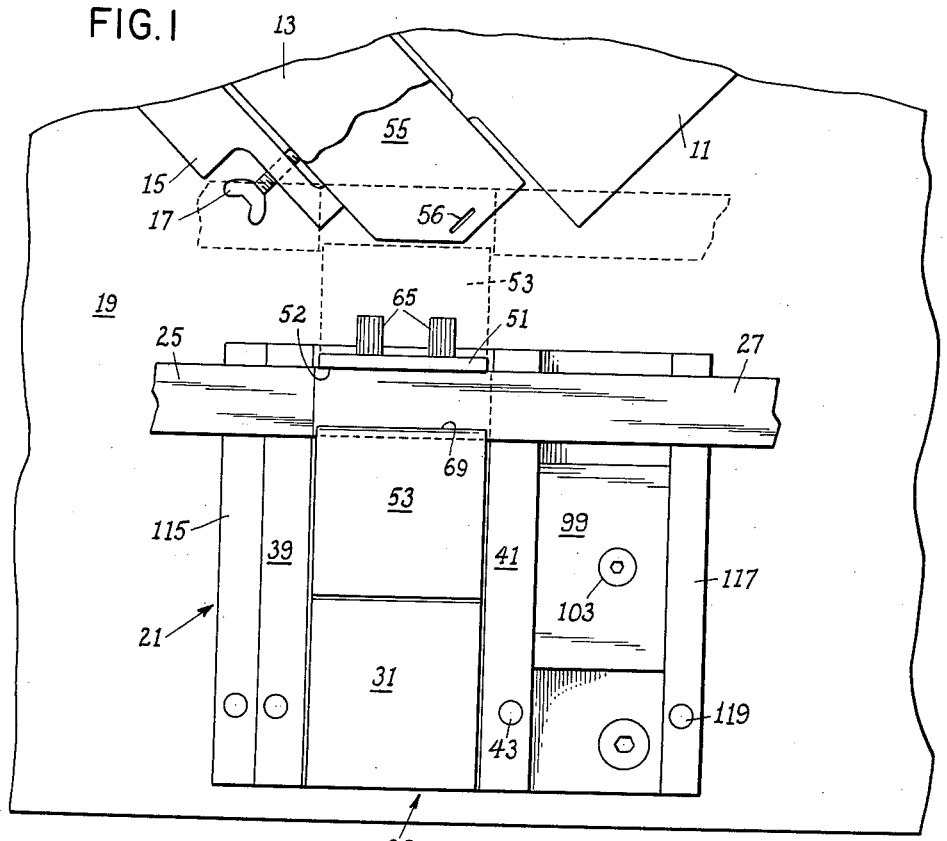
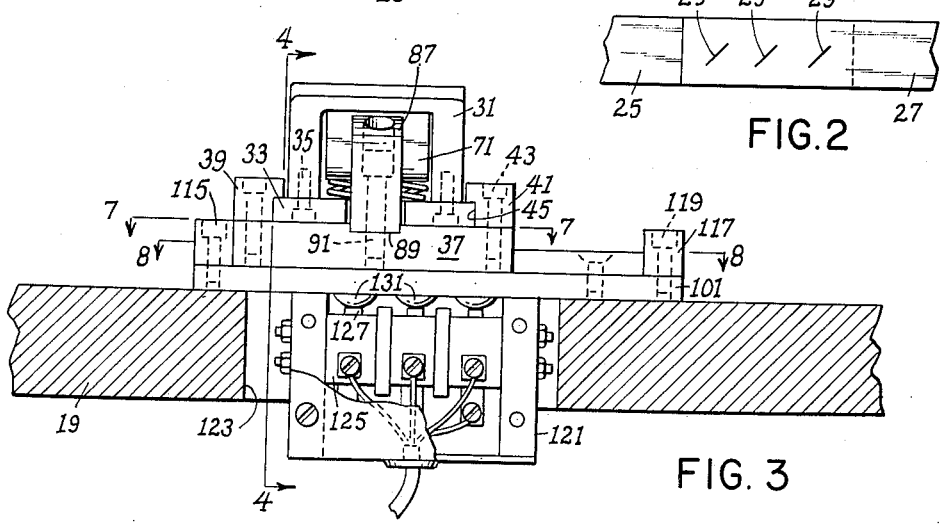

C. D. THOMAS 3,029,437

AUTOMATIC STAPLING MACHINE

Filed Jan. 21, 1960

April 17, 1962 C. D. THOMAS 3,029,437
AUTOMATIC STAPLING MACHINE
Filed Jan. 21, 1960 3 Sheets-Sheet 3

United States Patent Office 3,029,437
Patented Apr. 17, 1962

3,029,437
AUTOMATIC STAPLING MACHINE
Charles D. Thomas, Hamburg, N.Y., assignor to Dynacolor Corporation, Brockport, N.Y., a corporation of New York
Filed Jan. 21, 1960, Ser. No. 3,943
8 Claims. (Cl. 1—333)

The present invention relates to an automatic stapling machine of the type especially useful in stapling together two ends of 16 mm. film in such a manner that the spliced pieces of film are in exact alinement for putting through processing equipment. Of course, the automatic stapler may be used for other sizes of film or for tapes of similar shape.

An object of the invention is to provide a generally improved and more satisfactory automatic stapling machine for splicing together pieces of motion picture film.

Another object is the provision of a new and improved automatic stapler for film which fastens together the ends of two pieces in exact side-to-side alinement so as to be more readily accepted by processing equipment.

Yet another object is to provide an automatic stapler for quickly alining the overlapping ends of two pieces of film or tape or the like and for fastening together the alined overlapping ends with a plurality of staples.

A further object of the invention is the provision of a new and improved film holder for use in combination with an automatic stapler head, the film holder receiving and clamping the overlapping ends of two pieces of film, whereafter the staples are automatically inserted as the film is moved into the stapler head.

These and other desirable objects may be attained in the manner disclosed as an illustrative embodiment of the invention in the following description and in the accompanying drawings forming a part hereof, in which:

FIG. 1 is a top plan view of one corner of an automatic stapler head, and of a film holder with the films shown in place, the full line representation of the film holder being the loading or rest position, and the dotted line representation being the forwardly advanced stapling position wherein the films are located for receiving the staples;

FIG. 2 is a top plan view of a fragmentary portion of the stapled film;

FIG. 3 is an end elevation of the film holder shown in FIG. 1, the base being sectioned away and the housing of a switch box being broken away to show interior detail;

The same reference numerals throughout the several views indicate the same parts.

Figure 4:
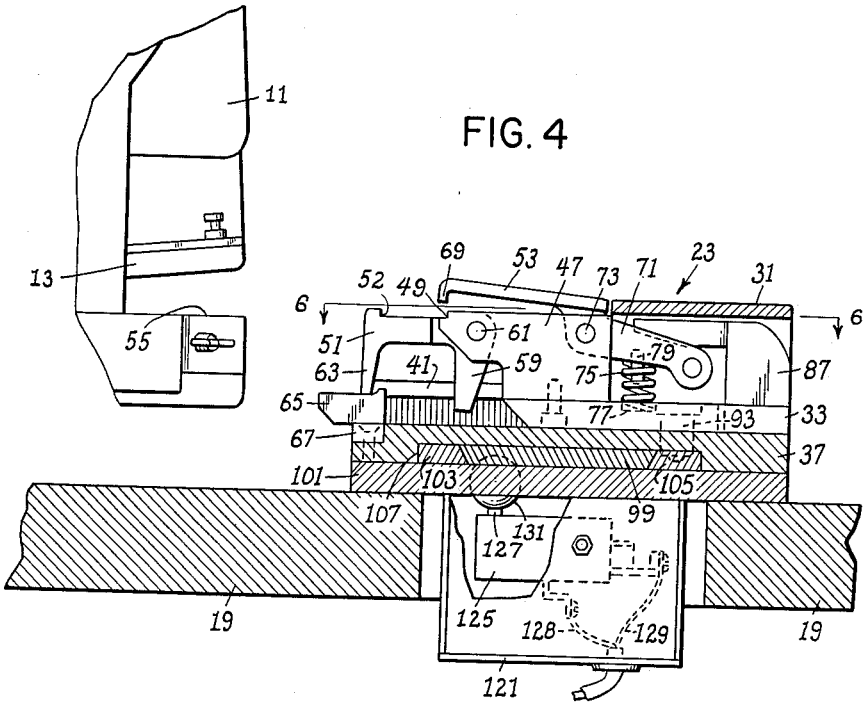
FIG. 4 is a vertical cross section taken approximately on the line 4—4 of FIG. 3 with the film holder shown in its rest position ready to load, portions being broken away to show interior detail.

In FIG. 1 is shown an automatic stapling machine including a housing 11, 15 which contains a stapler head 13, an anvil 55 having the usual staple clinching groove 56 therein, and means including a wingnut 17 for fastening the anvil 55 in the housing 11, 15. The stapling machine is of any conventional form including a motor operated device, not here shown, for automatically operating the stapler head 13 downwardly and upwardly toward and away from the anvil 55. Any suitable electrically operated automatic stapling machine may be used, however one corner of the anvil 55 of the machine here illustrated has been cut away at approximately a 45 degree angle in order to allow the proper entry of the elongated films or film pieces whose overlapping ends are to be stapled together.

Mounted in combination with the stapling machine on a common base board 19 is a film holder, here indicated generally at 21, the film holder 21 being mounted a short distance from the cut-away corner of the anvil 55. In other words, the axis of the anvil 55 is at about a 45 degree angle to the film holder 21, which is located on the base board 19 near its front edge so as to be accessible to the operator.

The film holder comprises an upper carriage 23 having at its forward edge a recess in which are received the overlapping ends of two films 25 and 27. The upper carriage 23 is movable forwardly on an intermediate carriage to be described later so as to be disposed in the dotted line position of FIG. 1 wherein the overlapping ends of the two films 25 and 27 are located over the anvil 55 of the stapler in position to receive a staple 29. Thereafter the upper carriage 23 and also the intermediate carriage are movable sidewardly to the right so that a plurality of staples 29 may be inserted for firmly splicing the film pieces together. A fragmentary portion of the resulting spliced film is shown in FIG. 2, wherein three staples 29 fasten the film ends together. Although two or any larger number of staples 29 may be used at any place where the films are joined together, it has been found that three staples provide a secure joint maintaining the two films in exact alinement. The side to side alinement is necessary to insure the smooth operation of processing film equipment as the spliced film is being processed. It may readily be seen that there is danger of catching a projecting film end at the side should the films not be in exact side to side alinement when being run through the processing equipment.

Referring to FIG. 3, the upper carriage includes an inverted U-shaped hand grip 31 fastened to the rear portion of the upper surface of a horizontally disposed slide plate 33. Preferably the securement is provided by means of Allen screws 35, this type of fastener preferably being used throughout the entire construction of the film holder so that the parts may be made as small units which may be easily assembled and disassembled. The upper slide plate 33 is slidable on a horizontally disposed intermediate carriage plate 37, guides for the sliding movements of the upper slide plate 33 being provided by a pair of spaced guide bars 39 and 41 extending in a front to rear direction and secured at the side of the intermediate carriage plate 37 as by means of screws 43. The opposing sides of the guide bars 39 and 41 are rabbetted as at 45 in order to provide guide grooves into which the side edges of the upper slide 33 are received. In this manner, the upper carriage 23 is movable forwardly and rearwardly with respect to the intermediate carriage.

Figure 6:
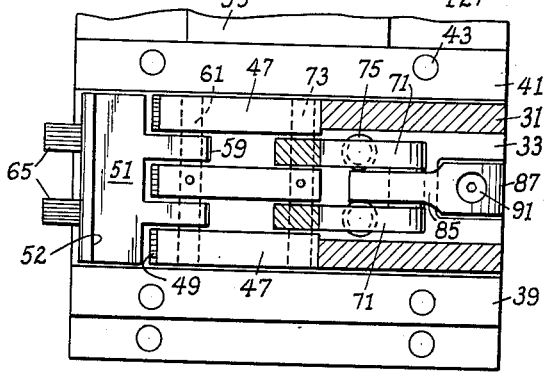
FIG. 6 is a horizontal cross section of the film holder taken approximately on line 6—6 of FIG. 4.

The forward portion of the upper carriage 23 is designed to receive and clamp in alinement the overlapping ends of the two films 25 and 27 which are to be stapled together. For this purpose, the front part of the upper slide plate 33 is provided with three upstanding clamping and pivot blocks 47, the three blocks being spaced from one another in a lateral direction as shown in FIG. 6. The upper part of each block 47 extends forwardly of the front edge of the upper slide plate 33, and the upper surface has a rabbet or shoulder 49 adapted to receive one side of the overlapping film ends 25 and 27. The upwardly facing portion of each rabbet 49 may be grooved to provide a better clamping surface for the film ends.

To provide a guide at the other side cooperating with the rabbets 49 so that the overlapping ends of the two films 25 and 27 may be alined sideways, a loading guide bar member 51 is mounted on the three upstanding blocks 47 and has an upstanding forward edge forming a recess 52 which is horizontally disposed (FIG. 4) in alinement with the rabbets 49 when the guide bar is in a loading position. The combined width of the recess 52 and the rabbets 49 when alined with each other is chosen so as to tightly receive the width of the film ends which are to be stapled together. By this means, it is assured that the two film pieces are in exact alinement when stapled together.

Figure 5:
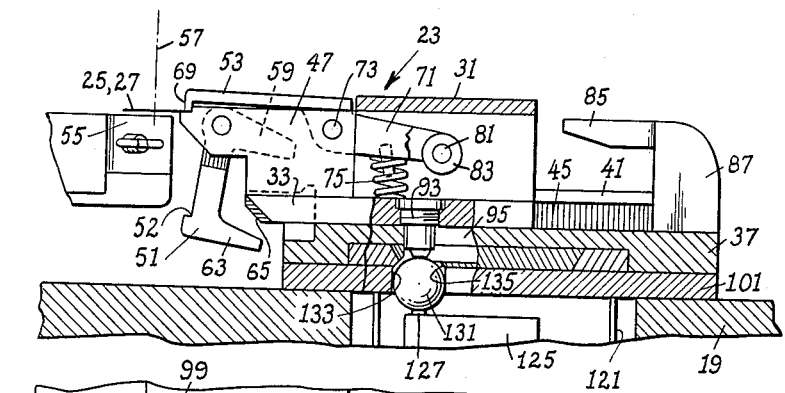
FIG. 5 is a view similar to FIG. 4 with the film holder shown in its forward stapling position, additional parts being broken away to show interior detail.

The guide bar member 51 is pivoted to the blocks 47 so as to be movable to a downward out-of-the-way position before the upper carriage 23 moves completely forward to its stapling position. As can be seen in FIG. 5, with the guide bar member 51 dropped away and the two film ends 25 and 27 clamped to the rabbets 49 by a clamping plate 53, the overlapping ends of the film pieces extend into the space below the stapling head 13 and just above the anvil 55 of the stapler approximately centered about a center line 57 of the staple which is to fasten the film together. The rabbets 49 thus comprise a stationary portion of the upper carriage for receiving the overlapping film ends, whereas the guide bar 51 provides a pivoted portion. To provide the pivotal mounting, the guide bar 51 has two rearwardly extending arms 59 which pass between the laterally spaced blocks 47, and a pivot rod 61 is mounted in the blocks 47 on which the arms 59 are journaled. It is desirable that the guide bar member 51 drop automatically to its downward position and that it be automatically returned to its horizontally disposed position simultaneously with the movements of the upper carriage backwardly from its stapling position to its loading position. To this end, the guide bar 51 is constructed with an L-shaped cross section having a downwardly extending front leg 63. The leg 63 cooperates with two laterally spaced guide bar actuating blocks 65 projecting forwardly from a common base 67 appropriately fastened to the front edge of the intermediate carriage plate 37. As best seen in FIG. 4, the leg 63 of the guide bar member 51 is supported on the upper surface of the guide blocks 65 with the upper carriage 23 in its loading position. The center of gravity of the guide bar member 51 together with its front leg 63 and rearwardly extending arms 59 is located to the left, or forward of, the pivot 61, whereby this unit automatically pivots downwardly as the upper carriage is slid forwardly to its stapling position and the leg 63 clears the end of the guide blocks 65. The rearwardly extending arms 59 of the guide bar member 51 are preferably developed as downwardly extending legs guided for motion between the blocks 47 and providing a counterbalancing force. The lower edge of the guide blocks 65 is chamfered downwardly and rearwardly so that in moving back from the stapling position to the loading position, the leg 63 engages around this chamfered edge and is cammed upwardly back to its vertical position resting on the guide blocks 65 wherein the guide bar member 51 is approximately horizontally disposed.

The clamping plate 53 previously mentioned is designed so as to clamp the rear edges of the overlapping ends of the films 25 and 27 to the rabbets 49 in the blocks 47 at about or just prior to the time at which the leg 63 of the guide bar member 51 clears the end of the guide blocks 65 and begins to drop automatically to its downwardly out-of-the-way position. The clamping plate 53 preferably extends laterally across the top of the three blocks 47 and has a downwardly turned flange 69 at its front edge which is movable into the rabbets 49 to produce the clamping action against the film ends 25 and 27. To pivot the clamping plate 53 for movement between a released position and a clamping position, a pair of rearwardly extending arms 71 are fastened to the under surface of the clamping plate 53, the arms 71 initially passing downwardly between the spaces between the blocks 47. A pivot rod 73 is mounted in the three blocks 47 and extends across through the arms 71 which are thereby pivoted thereon.

The clamping plate 53 is arranged to move automatically between its released and clamped positions as the upper carriage is moved forwardly to its stapling position, and conversely to return to its released position as the upper carriage is moved back to its loading position. To bias the clamping plate 53 to its clamping position, each arm 71 is acted upon by a compression spring 75 mounted at its lower end in a shallow bore 77 in the upper carriage slide plate 33 and loosely engageable at its upper end about a downwardly projecting pin 79 fixed in the arm 71.

To provide a device for automatically moving the clamping plate 53 to a released position by biasing the arms 71 downwardly against the force of the springs 75, the arms 71 are joined at their rear ends by a cross rod 81, the portion of the rod 81 between the arms 71 being enclosed by a cylindrical roller or bearing 83. The roller 83 cooperates with a forwardly extending cam 85 having a vertical mounting leg 87 mounted in a shallow recess 89, see FIG. 3, in the intermediate carriage plate 37. The leg 87 is rigidly fastened to the intermediate carriage plate 37 as by means of a screw 91 extending downwardly through a bore in the leg, whereby the cam 85 is fixed to the intermediate carriage. The cam 85 has a downwardly and rearwardly slanting lower edge which is engaged by the roller 83 as the upper carriage is moved rearwardly toward its loading position, to thereby pivot the rear ends of the legs 71 downwardly against the force of the springs 75 and consequently raise the clamping plate 53 to its released position. The length of the cam 85 and the length of the guide blocks 65 are arranged such that the clamping plate 53 moves to clamping position to securely clamp the overlapping ends of the films 25 and 27 in the rabbets 49 before the guide bar member 51 moves downwardly as the leg 63 clears the ends of the guide blocks 65.

To guide the upper carriage 23 for forward and rearward sliding movement on the intermediate carriage plate 37, see FIG. 5, a downwardly projecting stud 93 is fastened to the upper carriage slide plate 33 as by means of a threaded engagement. The stud 93 is movable within an elongated slot 95, FIG. 7, in the intermediate carriage plate 37 extending in a front to rear direction. The stud 93 further projects downwardly into a similarly extending recess leg 97, see FIG. 8, of a U-shaped recess in the upper surface of a laterally extending base slide 99. The base slide 99 has dovetailed edges and is fastened to a base plate 101 as by means of screws 103, the slide 99 and plate 101 together comprising a base. Cooperating with the base slide 99, see FIG. 4, are a pair of guide strips 103 and 105 respectively secured in the front and rear portions of a recess 107 in the lower surface of the intermediate carriage plate 37. The guide strips 103 and 105 each has a dovetail edge cooperating with one of the dovetail edges of the base slide 99, and the rear guide strip 105, see FIG. 8, has a shallow recess 109 in alinement with the recess leg 97 of the U-shaped recess in the base slide 99. The upper carriage is in its loading position when the stud 93 engages in this guide strip recess 109.

After the upper carriage has been moved forwardly relative to the intermediate carriage by means of the stud 93 moving within the slot 95 in the intermediate carriage plate 37 and the alined recess leg 97 in the base slide 99, the upper carriage and the lower carriage are thereafter movable laterally together. For this movement, the end of the stud 93 travels in a connecting cross portion 111 of the U-shaped recess in the base slide 99, both carriages sliding together on the base slide 99. This, of course, has the effect of moving the clamped film ends 25 and 27 laterally relative to the stapler. At the end of the sidewards movement, the upper carriage may be retracted by sliding rearwardly relative to the intermediate carriage by means of the stud 93 traveling in another leg 113 of the U-shaped recess in the base slide 99. At this point, the slot 95 in the intermediate carriage plate 37 is alined with this other recess leg 113. Additional sideward limits for the lateral movement of the intermediate carriage are provided by two oppositely disposed side bars 115 and 117 fixed to the base plate 101.

A plurality of switches are provided in the film holder unit 21 to be closed by movements of the upper carriage for actuating a motor in the automatic stapling machine, the final effect being to operate the stapler head 13 to insert staples 29 into the overlapping film ends 25 and 27. The switches, see FIGS. 3 and 4, are contained within a housing 121 suitably fastened to the lower surface of the base plate 101. The base board 19 has an appropriate aperture 123 through which the housing 121 extends, this aperture, of course, being smaller than the base plate 101. In the present embodiment, the films 25 and 27 are to be stapled together by three staples 29, and consequently three laterally spaced microswitches 125 are provided to be actuated separately in sequence. The three microswitches 125 are fastened together in a row to the side walls of the housing 121. Each microswitch 125 has an actuating arm 127 which is spring biased upwardly to an open position, the microswitch being closed by depressing the actuating arm 127. As is conventional, each microswitch 125 has a pair of leads 128 and 129 which extend outwardly through an aperture in the housing 121 and are joined together as a cable to be conducted to the automatic stapling machine.

The actuation of each actuating arm 127 of the various microswitches is accomplished by means of a metallic ball 131, preferably of steel, resting on and spring biased upwardly by the actuating arm 127 into an aperture 133 in the base plate 101. The aperture 133 is cylindrical and is preferably chamfered at its upper end. Three such steel balls 131 are provided in three similar apertures 133, the spacing of the steel balls 131 and the actuating arms 127 corresponding to the spacing of the staples 29 in the finished stapled film as shown in FIG. 2. Each aperture 133 is in alinement with a chamfered aperture 135 in the base slide 99 within or in line with the connecting cross portion 111 of the U-shaped recess therein. The chambering of the apertures 133 and 135 is such that the steel ball projects slightly through the aperture 135 but is limited in its upward movement by engagement with these chamfers.

It will be understood that the microswitches 125 are actuated in sequence by pressing down on its respective steel ball 131 to thereby close its actuating arm 127. This downward movement of the steel balls 131 is performed by the diametrically reduced lower end of the stud 93 carried by the upper carriage slide plate 33. Thus, as the upper carriage is moved forwardly to its stapling position, and as the upper carriage and the intermediate carriage are moved sideways simultaneously, corresponding to the movement of the stud 93 in the recess leg 97 and the connecting cross portion 111, the reduced lower end of the stud 93 passes in sequence over each of the steel balls 131 to actuate the three microswitches 125 in a corresponding sequence. Preferably, the first steel ball 131 together with apertures in which it is received is located at the end of the recess leg 97 so that the first microswitch 125 is closed simultaneously with the movement of the upper carriage to its stapling position from its loading position. In similar fashion, the third of the steel balls 131 is preferably located at the forward end of the other leg 113 of the U-shaped recess. In this fashion, the upper carriage may be moved forwardly to its stapling position, simultaneously placing the first staple in the overlapping film ends 25 and 27, then may be moved sidewardly to actuate the second of the steel balls 131, and then further sidewardly to actuate the third of the steel balls 131, after which the upper carriage may be retracted within the recess leg 113. Conversely, the upper carriage may be moved first within the recess leg 113, from the front end of the recess leg 113 sideways, in the connecting cross portion 111, and then rearwardly back through the recess leg 97.

The operation of the automatic stapling machine of the invention is simple and convenient and adaptable for use by a highly productive processing laboratory. To load the film, the upper carriage is placed in its rearward loading position as shown in FIG. 4. One of the film ends 25 or 27 is placed within the alined recess 52 and rabbets 49 with its edges tightly received against the upstanding oppositely disposed shoulders. The other of the film ends is then placed in overlapping relation to the first, and is received within the recess 52 and the rabbets 49 with its edges similarly tightly wedged against the opposing shoulders. There is thus assurance that the overlapping film ends are in alinement from side to side.

Figure 7:
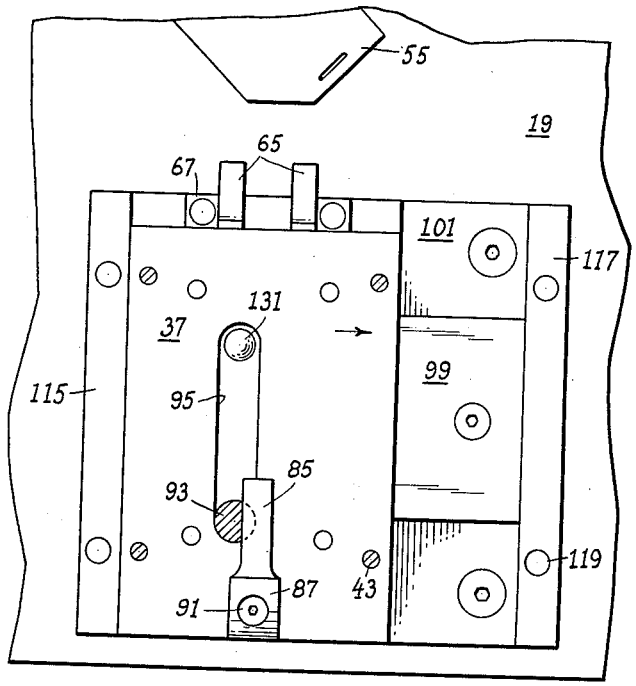
FIG. 7 is a horizontal cross section of the film holder taken approximately on the line 7—7 of FIG. 3.
Figure 8:
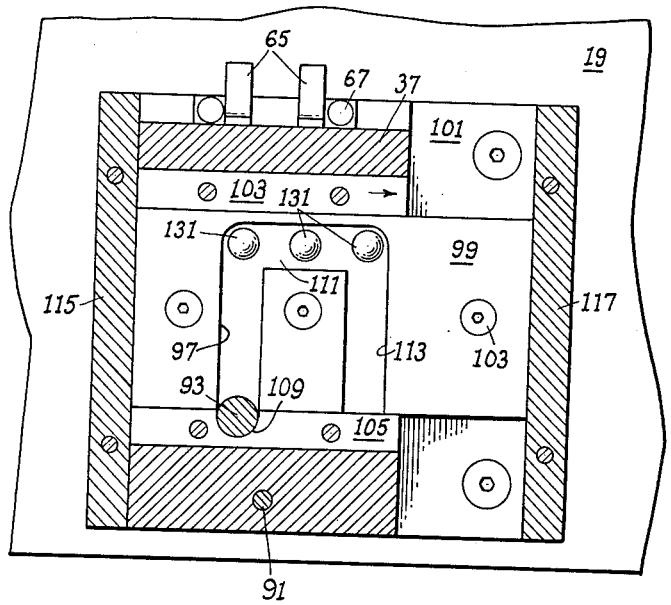
FIG. 8 is a horizontal cross section taken approximately on the line 8—8 of FIG. 3.

The hand grip 31 of the upper carriage 23 is then grasped with one hand and moved forwardly, the forward motion of the upper carriage being guided by the stud 93 moving within the recess leg 97 of the U-shaped recess in the base slide 99, and also within the slot 95 in the intermediate carriage plate 37 which is in alinement with this recess leg (FIGS. 7 and 8). As the upper carriage moves forwardly, the roller 83 on the connecting rod 81 between the arms 71 attached to the clamping plate 53 slides along the cam 85 rigidly secured to the intermediate carriage plate 37. As the roller 83 moves off of the cam 85, the spring 75 acting on each arm 71 pivots the arms 71 upwardly while simultaneously pivoting the clamping plate 53 downwardly to its clamping position wherein the forward flange 69 clamps the rear sides of the overlapping film ends 25 and 27 in the rabbets 49. At about the time that the clamping of the film takes place, the guide bar member 51 having the recess 52 begins to pivot downwardly by gravity as its leg 63 passes off the end of the guide blocks 65 carried by the intermediate carriage plate 37. The guide bar member 51 and its leg 63 drop to a downwardly out-of-the-way position as illustrated in FIG. 5.

As the upper carriage moves forwardly within the alined slot 95 and recess leg 97, the lower diametrically reduced end of the stud 93 fixed to the upper carriage passes over the first of the steel balls 131 to depress the steel ball and close the actuating arm 127 of the first microswitch 125. Forward motion of the stud 93 and of the upper carriage is limited by engagement of the stud 93 with the end of the slot 95 and recess leg 97. As the first microswitch 125 is closed, the automatic stapling mechanism in the housing 11, 15 is actuated to automatically operate the stapler head 13 to insert the first of the staples 29 into the overlapping ends of films 25 and 27. Thus it is seen that the one step of grasping the hand grip 31 and moving the upper carriage from its rear loading position to its forward stapling position simultaneously closes the first of the microswitches 125 to place a staple in the overlapping film ends.

The hand grip 31 is then manually moved sidewardly to the right as shown in the drawings to slide both the upper carriage 23 and the intermediate carriage plate 37 together with its dovetail guide strips 103 and 105 laterally to the right along the base slide 99. There is no relative movement of the upper and intermediate carriages as this lateral movement is taking place due to the abutment of the stud 93 on the side of the slot 95 in the intermediate carriage plate 37. The stud 93 now moves sidewardly within the connecting cross portion 111 of the U-shaped recess in the base slide 99, depressing, in sequence, the second and third of the steel balls 131. Consequently, the second and third microswitches 125 are closed in sequence to automatically operate the stapler head 13 to place two additional staples 29 in the overlapping ends of the films 25 and 27, the staples 29 being spaced from one another. As the stud 93 moves off of each of the balls 131, the respective microswitch actuated arm 127 is spring biased upwardly to again open the switch.

After the third staple has been inserted, the hand grip 31 is moved toward the rear, the stud 93 now moving within the alined slot 95 and the recess leg 113. As the upper carriage 23 is retracted, the leg 63 of the guide bar member 51 rides around the front edge of the guide blocks 65 until the end of the leg 63 is sliding over the horizontal portion of the guide blocks. Thus the guide bar member 51 is again horizontally disposed with the recess 52 in alinement with the rabbets 49. As the roller 83 engages and rides down on the cam 85, the arms 71 connected to the clamping plate 53 are depressed against the force of the springs 75 and the clamping plate 53 simultaneously is raised to its released position wherein the front flange 69 no longer clamps the side edges of the now stapled together film ends 25 and 27.

The operation of the automatic stapling machine may take place in the converse direction, that is, with the stud 93 riding first in the recess leg 113, then laterally to the left in the connecting cross portion 111, and then rearwardly within the recess leg 97. A rearwardmost rest position for the upper carriage 23 is provided, however, with the stud 93 in the recess leg 97 projecting into the recess 109 in the intermediate carriage guide strip 105, as shown in FIG. 8.

That the operation of the automatic stapling machine is simple and convenient is seen from the fact that the only steps required are to place the ends of the films 25 and 27 in overlapping relation on the guide bar member 51 and rabbets 49, to grasp the hand grip 31 and move it forwardly, then to the side, and then rearwardly, and to remove the stapled together films from the recess 52 and rabbets 49. The automatic stapling machine may be any suitable type presently available, the only modification being to cut away the front corner of the anvil and, if necessary, a corner of the outer casing or housing at about a 45 degree angle. Coupled with the simplicity of the film holder 21 and the ease with which it may be manufactured and assembled, the result is a relatively inexpensive automatic stapling machine which is yet dependable and rugged enough for use in a processing laboratory.

The preferred embodiment has been described with reference to a 16 millimeter film. The automatic stapling machine may, however, be made in different sizes so as to be adapted to receive and staple together other sizes of film. Furthermore, the stapling machine may be used for stapling together tapes or the like having a shape similar to that of motion picture film.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A film holder for use in combination with an electrically controlled automatic stapling head adapted to be mounted adjacent thereto, said film holder comprising a base, an intermediate carriage slidably mounted on said base for lateral movement, an upper carriage having means including a stationary portion and an alined pivoted guide bar for releasably receiving in alinement the overlapping ends of two films to be stapled together, said upper carriage being slidably mounted on said intermediate carriage for movement between a rear loading position and a forward stapling position in which said alined film ends are adapted to be disposed in position to receive a staple driven by said stapling head, means for mounting said pivoted guide bar so as to automatically drop by gravity to an out of the way downward position as said upper carriage is manually shifted forwardly from said loading to said stapling position, clamping means for automatically clamping the rear side edges of said film ends in said stationary portion as said guide bar drops to said downward position, means for guiding said intermediate and upper carriages for conjoint lateral movement when said upper carriage is in said stapling position, a plurality of laterally spaced microswitches for actuating said stapling head to insert staples in said overlapping film ends, means for automatically closing said microswitches in sequence as said upper carriage moves to said stapling position and as said intermediate and upper carriages move laterally together, said pivoted guide bar returning automatically in alinement with said stationary portion as said upper carriage is manually returned to said loading position, and said clamping means automatically moving to a released position as said upper carriage is returned to said loading position.

2. A construction as defined in claim 1, wherein said means for mounting said pivoted guide bar includes a front leg carried thereby and at least one guide block secured to the forward end of said intermediate carriage, said leg resting on said guide block in said loading position of said upper carriage and dropping off the front edge thereof during movement to said stapling position, said leg being cammed upwardly by said guide block during movement to said loading position.

3. A construction as defined in claim 1, wherein said clamping means includes a clamping plate pivoted to said upper carriage and having a front flange engageable in said stationary portion, a forwardly extending cam fixed to said intermediate carriage, and rearwardly extending means carried by said clamping plate and biased to bias said clamping plate to a clamping position, said rearwardly extending means being engageable with said cam to urge said clamping plate to a released position during the final portion of movement of said upper carriage to said loading position.

4. A construction as defined in claim 1, wherein said means for automatically closing said switches includes a plurality of separate rigid members each engaging one of the actuating arms of said microswitches and extending upwardly through said base, and a stud secured to said upper carriage for depressing said rigid members in sequence during said forward and lateral movements thereof to thereby close said microswitches.

5. A film holder for use in combination with an electrically controlled automatic stapling head adapted to be mounted adjacent thereto, said film holder comprising a base, an intermediate carriage slidably mounted on said base for lateral movement, an upper carriage having means including a stationary portion and an alined pivoted portion for releasably receiving in alinement the overlapping ends of two films to be stapled together, means for slidably mounting said upper carriage on said intermediate carriage for limited movement between a rear loading position and a forward stapling position in which said alined film ends are adapted to be disposed in position to receive a staple driven by said stapling head, means for mounting said pivoted portion so that said pivoted portion automatically drops by gravity to an out of the way downward position as said upper carriage is manually shifted from said loading to said stapling position, said pivoted portion moving automatically back into alinement with said stationary portion as said upper carriage is manually shifted from said stapling to said loading position, clamping means for clamping the rear side edges of said overlapping film ends in said stationary portion of said upper carriage as said pivoted portion moves to said downward position, said clamping means moving to a released position automatically as said upper carriage is returned to said loading position, means for guiding said intermediate and upper carriages for conjoint lateral movement when said upper carriage is in said stapling position, a plurality of switches adapted to actuate said stapling head to insert staples into said overlapping film ends, and means for closing said switches in sequence when said upper carriage is moved in said stapling position.

6. The combination with an electrically controlled automatic stapling head, of a film holder mounted adjacent thereto, said film holder comprising a base, an intermediate carriage slidably mounted on said base for lateral movement, an upper carriage having means for releasably receiving in alinement the overlapping ends of two films to be stapled together, said upper carriage being slidably mounted on said intermediate carriage for movement between a rear loading position and a forward stapling position in which said alined film ends are disposed in position to receive a staple driven by said stapling head, said means for releasably receiving said film ends including a pivoted guide bar which automatically drops by gravity to an out of the way downward position as said upper carriage is manually shifted from said loading to said stapling position, clamping means for clamping the rear side edges of said film ends in said upper carriage as said guide bar moves to said downward position, said clamping means moving to a released position automatically as said upper carriage is returned to said loading position, means for guiding said intermediate and upper carriages for conjoint lateral movement when said upper carriage is in said stapling position, a plurality of switches for actuating said stapling head to insert staples into said overlapping film ends, and means for closing said switches in sequence when said upper carriage is moved in said stapling position.

7. The combination with an electrically controlled automatic stapling head, of a film holder mounted adjacent thereto, said film holder comprising a base, an intermediate carriage slidably mounted on said base for lateral movement, an upper carriage having means including a stationary portion and an alined pivoted portion for releasably receiving in alinement the overlapping ends of two films to be stapled together, means for slidably mounting said upper carriage on said intermediate carriage for limited movement between a rear loading position and a forward stapling position in which said alined film ends are disposed in position to receive a staple driven by said stapling head, means for mounting said pivoted portion so that said pivoted portion automatically drops by gravity to an out of the way downward position as said upper carriage is manually shifted forwardly from said loading to said stapling position, said pivoted portion moving automatically back into alinement with said stationary portion as said upper carriage is manually shifted rearwardly from said stapling to said loading position, clamping means for automatically clamping the rear side edges of said overlapping film ends in said stationary portion of said upper carriage as said pivoted portion moves to said downward position during movement of said upper carriage to said stapling position, said clamping means moving to a released position automatically as said upper carriage is returned to said loading position, means for guiding said intermediate and upper carriages for conjoint lateral movement when said upper carriage is in said stapling position, said guiding means including a stud carried by said upper carriage extending through a slot in said intermediate carriage and engaging in a guide recess in said base, a plurality of laterally spaced switches carried by said base for actuating said stapling head to insert staples into said overlapping film ends, each of said switches having a spring biased actuating arm, and a metallic ball resting on each said actuating arm and projecting upwardly into said base recess, said stud depressing each of said metallic balls in sequence as said upper carriage moves to said stapling position and as said intermediate and upper carriages move laterally together.

8. A construction as defined in claim 7, wherein said clamping means includes a forwardly extending cam fixed to said intermediate carriage, a clamping plate pivoted to said upper carriage and having a front flange movable into said stationary portion in a clamping position thereof, at least one arm extending rearwardly from said clamping plate and biased to thereby bias said clamping plate to said clamping position, said arm being depressed by said cam in said loading position of said upper carriage and in movements to said loading position to raise said clamping plate to a released position.

No references cited.